(12) United States Patent
Kishimoto

(10) Patent No.: US 8,634,641 B2
(45) Date of Patent: Jan. 21, 2014

(54) COLOR PROCESSING APPARATUS AND COMPUTER READABLE MEDIUM FOR COLOR PROCESSING

(75) Inventor: Yasunari Kishimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 416 days.

(21) Appl. No.: 13/114,561

(22) Filed: May 24, 2011

(65) Prior Publication Data

US 2012/0163716 A1 Jun. 28, 2012

(30) Foreign Application Priority Data

Dec. 24, 2010 (JP) .................................. 2010-288446

(51) Int. Cl.
*G06K 9/00* (2006.01)
(52) U.S. Cl.
USPC ........................................................ 382/167
(58) Field of Classification Search
USPC ............ 382/162–167; 345/589–611; 358/1.9, 358/518–523; 348/222.1–225.1
See application file for complete search history.

(56) References Cited

U.S. PATENT DOCUMENTS

| | | | |
|---|---|---|---|
| 5,073,818 A | 12/1991 | Iida | |
| 5,080,873 A | 1/1992 | Ono et al. | |
| 5,956,044 A * | 9/1999 | Giorgianni et al. | 345/590 |
| 5,963,201 A * | 10/1999 | McGreggor et al. | 715/722 |
| 6,229,916 B1 | 5/2001 | Ohkubo | |
| 6,320,980 B1 | 11/2001 | Hidaka | |
| 6,567,543 B1 * | 5/2003 | Shiraiwa et al. | 382/167 |
| 6,628,822 B1 * | 9/2003 | Nakabayashi et al. | 382/162 |
| 7,345,798 B2 * | 3/2008 | Kondo | 358/523 |
| 7,456,843 B2 * | 11/2008 | Chen et al. | 345/589 |
| 7,742,206 B2 * | 6/2010 | Dalrymple et al. | 358/518 |
| 7,760,406 B2 * | 7/2010 | Shigeta | 358/518 |
| 8,325,396 B2 * | 12/2012 | Kishimoto | 358/518 |
| 8,379,106 B2 * | 2/2013 | Koishi | 348/223.1 |
| 8,411,944 B2 * | 4/2013 | Ohga | 382/167 |
| 2001/0028471 A1 | 10/2001 | Hirokazu | |
| 2005/0052668 A1 | 3/2005 | Hoshino | |
| 2012/0206744 A1 * | 8/2012 | Kobayashi | 358/1.9 |

FOREIGN PATENT DOCUMENTS

| | | |
|---|---|---|
| EP | 0 579 224 A1 | 1/1994 |
| EP | 0 579 224 B1 | 11/1998 |
| JP | A-1-119594 | 5/1989 |
| JP | A-1-167791 | 7/1989 |
| JP | A-1-281524 | 11/1989 |
| JP | A-10-341348 | 12/1998 |
| JP | A-11-112819 | 4/1999 |
| JP | A-11-177834 | 7/1999 |
| JP | A-2002-33936 | 1/2002 |
| JP | B2-3412985 | 6/2003 |
| JP | A-2005-63168 | 3/2005 |

* cited by examiner

*Primary Examiner* — Ishrat I Sherali
(74) *Attorney, Agent, or Firm* — Oliff and Berridge, PLC

(57) ABSTRACT

A color processing apparatus includes a generating unit that generates correction information to a second white point from luminance information of a first white point, which is a white point of color information of a given processing target, and luminance information of a target white point, and a color correcting unit that performs a color correcting process on the color information of the processing target using the correction information to the second white point generated by the generating unit.

6 Claims, 3 Drawing Sheets

COLOR PROCESSING APPARATUS AND COMPUTER READABLE MEDIUM FOR COLOR PROCESSING

CROSS-REFERENCE TO RELATED APPLICATION

This application is based on and claims priority under 35 USC 119 from Japanese Patent Application No. 2010-288446 filed on Dec. 24, 2010.

BACKGROUND

1. Technical Field

The present invention relates to a color processing apparatus and computer readable medium for color processing.

2. Related Art

Color processing is needed in order to match color spaces depending on different input/output devices. For example, image forming apparatuses, such as printers or electrophotographic apparatuses, use four or more color materials. Therefore, a color space using the colors of the color materials as elements is used as a device-dependent color space. In addition, display devices, such as monitors, and image reading apparatuses, such as cameras or scanners, use, for example, an RGB color space. In order to match the device-dependent color spaces, a perceptually uniform color space that does not depend on devices, such as CIELAB, or a color space having the characteristics of a color appearance model, such as CIECAM02, is used. In addition, for example, a tristimulus value CIEXYZ or an LMS color space is used.

The correction of a white point is one of the processes of combining the colors of different color spaces. In the display of an image by a display device or a reflected image using a paper medium, the white point (substantially corresponding to a point with the highest lightness) is not set at a given value, but is likely to vary depending on the processing system or the medium (for example, a sheet). Therefore, the white point needs to be corrected in order to match the dynamic ranges of given color information and color information to be output. In this case, the color space of the given color information may be converted into a common color space and a process of correcting the white point may be performed to convert the color space into a color space to which the processed color information will be output. In this way, the process of correcting the white point may be performed in the common color space. For example, the common color space may be CIELAB and the process of correcting the white point may be a process of correcting the color information of the CIELAB color space to the color information of the CIELAB color space.

As the correction of the white point, for example, there is a method that normalizes the white point using CIEXYZ, which is the colorimetric value of a white point of a sheet set by the specifications (ISO15076-1) of an ICC profile (a method of normalizing relative colorimetric rendering intent uses a white point of a sheet instead of a light source that is used for conversion from the tristimulus value CIEXYZ to CIELAB. For example, since this processing method is implemented by conversion from CIELAB to CIEXYZ and color conversion from CIELAB to CIELAB that is performed during conversion from CIEXYZ to CIELAB, it is unclear whether the processing method is a CIEXYZ process or a CIELAB process. However, in principle, the processing method is equivalent to a structure that performs reversible connection using conversion into CIEXYZ, thereby omitting calculation. Therefore, in the invention, the processing method is represented as a conversion process from CIEXYZ to CIEXYZ).

SUMMARY

According to an aspect of the invention, there is provided a color processing apparatus including:

a generating unit that generates correction information to a second white point from luminance information of a first white point, which is a white point of color information of a given processing target, and luminance information of a target white point; and a color correcting unit that performs a color correcting process on the color information of the processing target using the correction information to the second white point generated by the generating unit.

BRIEF DESCRIPTION OF THE DRAWINGS

Exemplary embodiments of the present invention will be described in detail based on the following figures, wherein.

DETAILED DESCRIPTION

Figure 1:
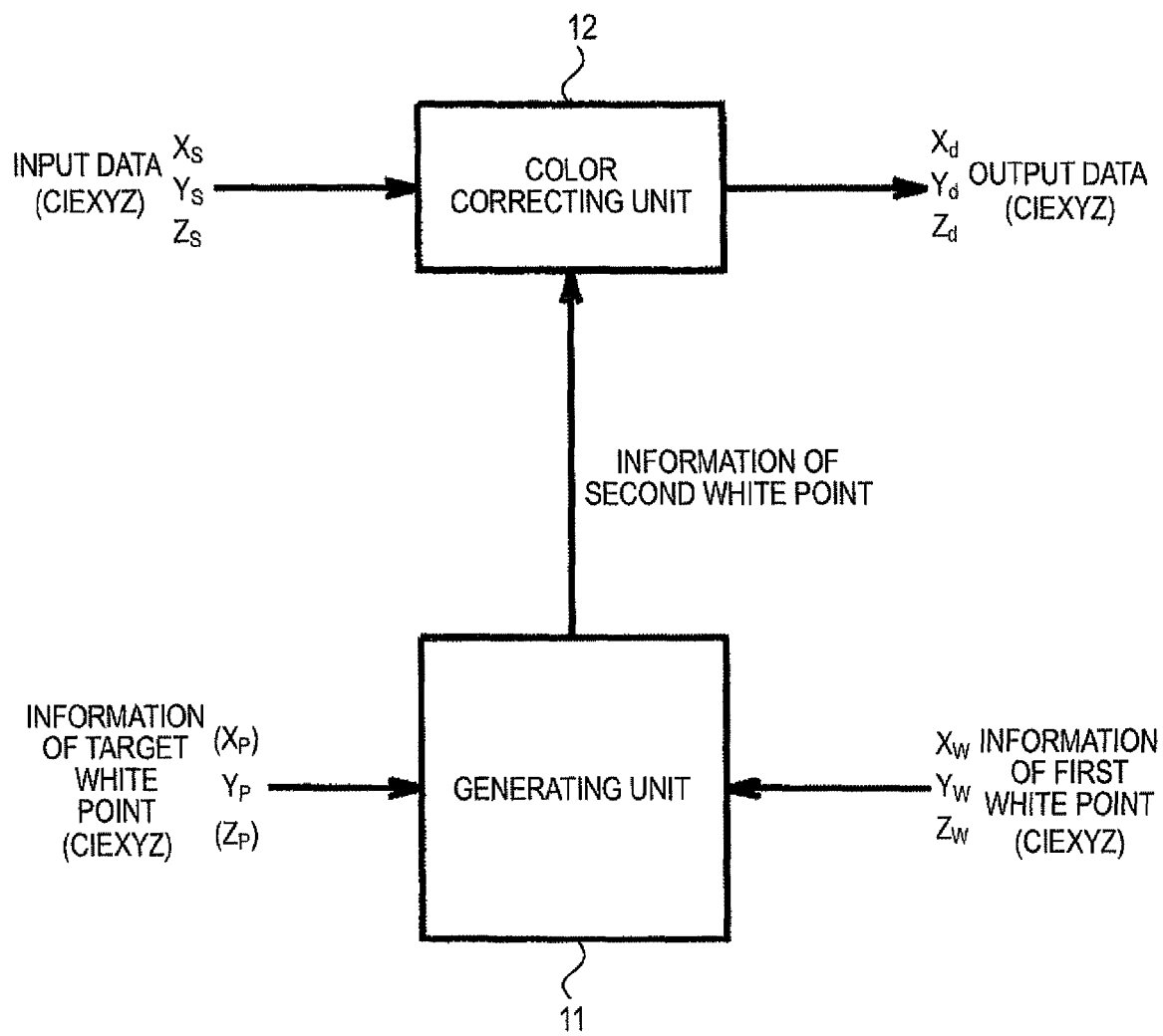
FIG. 1 is a diagram illustrating the structure of an exemplary embodiment of the invention.

FIG. 1 is a diagram illustrating the structure of an exemplary embodiment of the invention. In FIG. 1, reference numeral 11 is a generating unit and reference numeral 12 is a color correcting unit. In the following description, it is assumed that the colorimetry of the color information of a processing target and the processed color information to be output are defined by a standard-setting organization (for example, International Commission on Illumination or ISO) and a tristimulus value CIEXYZ is used since it is most commonly used. Of course, the color space is not limited to CIEXYZ, but other color information items, for example, the color information of a color space that treats optical energy, such as a color space that is calculated on the basis of a spectral distribution or a color space (for example, an LMS color space) that is linearly converted from CIEXYZ, may be used. For example, CIECAM02, sRGB, CMYK, CIELAB, and density are excluded since they are not linear with respect to energy, but color conversion from, for example, CIELAB may be performed. In addition, the color information of the processing target and the processed color information to be output are not particularly limited. The color information of the processing target and the processed color information to be output may be a real value or may be encoded. In addition, the color information may be in the form of a color conversion coefficient or an ICC profile.

The generating unit 11 generates correction information to a second white point from the information of the luminance Y (corresponding to luminance Y of CIEXYZ) of a first white point, which is a white point of the color information of a given processing target, and the information of the luminance Y of a target white point. The luminance of the first white point and the luminance of the target white point may have the same attribute. For example, a combination of Y and Y, a combination of X and X, or Y in an XYZ color space and M in an LMS color space may be used. The color correcting unit 12 performs a color correcting process on the color information of the processing target using the correction information to the second white point which is generated by the generating unit 11.

Next, a color correcting process when color information displayed on a display device is output to an image forming apparatus will be described as an example. Of course, the invention is not limited thereto. The color information displayed on the display device is RGB color information, and the white point is in CIEXYZ of a D50 light source when the color space is converted into CIEXYZ (D50). The measurement of an image forming medium of the image forming apparatus may be performed with a spectral distribution, and the white point of the image forming medium may be acquired in CIEXYZ (D50). In this case, in CIEXYZ, each luminance value is normalized with a reference white such as a BCRA tile.

For example, assuming that the user edits (retouches) an image so as to improve its appearance while viewing the image displayed on the display device, the user observes the image which is displayed on the display device in a given observation environment and the image formed on the image forming medium while comparing them. In this case, the luminance (for example, spectral luminous efficiency or luminance Y) of the white point of the display device and the illuminance of the observation environment are managed such that white with the same density is obtained. In this way, the colors of two images are close to each other and it is easy to compare, for example, the dynamic range of color management. That is, both the luminance Yw of a white point CIEXYZ of the display device and the luminance Yp of a white point CIEXYZ of the image forming medium have a given value. The white point in the observation environment of the image displayed on the display device is likely to depend on the setting of the display device rather than the influence of an external environment. Therefore, in principle, the display device and the image forming medium may be observed at different positions. Therefore, the tristimulus value CIEXYZ that is matched with luminance indicating light and darkness common to two observation environments is generated from the tristimulus value CIEXYZ that is normalized with each observation or measurement condition, and the color displayed on the display device is close to the color on the image forming medium.

Since the correction of the white point is determined by the relationship between an input and an output, color information to be output is likely to be outside the color region when an image is formed. The image displayed on the display device is colorimetrically matched with the image formed on the image forming medium. However, when color information is outside the color region, for example, a color region mapping process is performed, which may cause a change in color.

Figure 2:
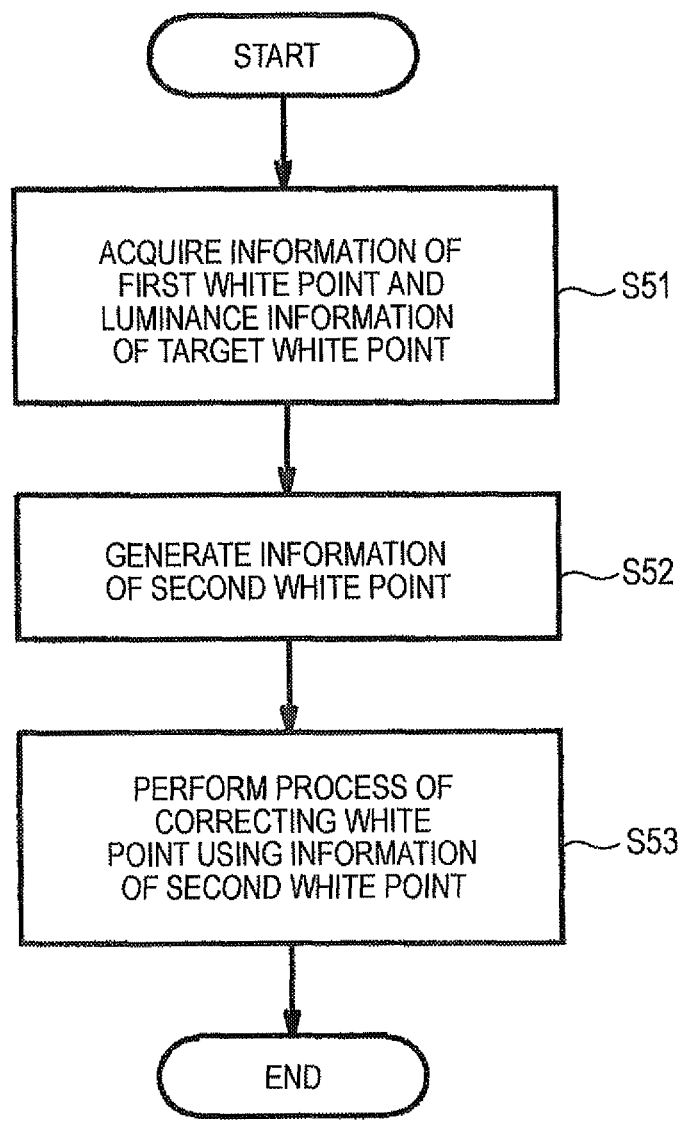
FIG. 2 is a flowchart illustrating an example of the operation of the exemplary embodiment of the invention.

FIG. 2 is a flowchart illustrating an example of the operation of the exemplary embodiment of the invention. In Step S51, the generating unit 11 acquires the luminance information Yw of a first white point (Xw, Yw, Zw) and the luminance information Yp of a target white point. The first white point (Xw, Yw, Zw) may be acquired from, for example, the standard value (CIEXYZ of a D50 light source when a color temperature is matched) of a standard RGB color space or the tag information of an ICC profile used when an image is displayed on the display device. Alternatively, the first white point may be acquired from a combination of color information given to the display device and the measurement information of a displayed color. When the first white point is not a white point of the display device, various kinds of white points, such as a white point of a standard image forming medium, an average white point, and the information of white among the color information items of a given processing target, may be virtually used as the first white point. As the target white point (Xp, Yp, Zp), the colorimetric information of the white (for example, a sheet) of the image forming medium (for example, a sheet) on which an image is formed may be acquired. In addition, the image forming medium may be arranged in an observation environment and the target white point may be measured by, for example, a spectral luminance meter. Of course, the luminance information of the target white point may be given by various kinds of methods.

In Step S52, the generating unit 11 generates correction information to a second white point (Xt, Yt, Zt) from the luminance information Yw of the first white point (Xw, Yw, Zw) and the luminance information Yp of the target white point (Xp, Yp, Zp) acquired in Step S51. The relationship between the information of the second white point (Xt, Yt, Zt) and the correction information is represented by, for example, the following Expression 1:

$$\begin{pmatrix} X_t \\ Y_t \\ Z_t \end{pmatrix} = \begin{pmatrix} X_w \\ Y_w \\ Z_w \end{pmatrix} \times \frac{Y_p}{Y_w} \qquad [\text{Expression 1}]$$

The correction information is (Yp/Yw). In this example, the luminance information Yt of the second white point (Xt, Yt, Zt) is the luminance information Yp of the target white point. The generating unit 11 may transmit the correction information (Yp/Yw) to the color correcting unit 12 when the color correcting unit 12 performs a correction process using Expression 1. Alternatively, when it is premised that color conversion is performed from the tristimulus value CIEXYZ as in a perceptive color space (for example, a CIELAB color space or a CIECAM02 color space), color information for generating the perceptive color space uses the correlation (given luminance/luminance of illumination information) between the tristimulus value CIEXYZ and light source information, not the value of the tristimulus value CIEXYZ. Therefore, the generating unit 11 does not generate a new tristimulus value CIEXYZ, but may transmit the correlation with the generated second white point (Xt, Yt, Zt) to the color correcting unit 12. For example, in a case in which the illuminance of the observation environment is not managed with respect to the set luminance of the display device or the luminance of the display device measured by a correcting device and the illuminance is higher than a reference value, when an image is formed using the luminance Y of the white point of the sheet as the luminance information Yp of the target white point, the chroma of the image is likely to be more than the reference value as a whole. In order to adjust the chroma, the luminance information of the target white point is controlled. Alternatively, a in the following Expression 4 may be used in order to adjust the chroma.

In Step S53, the color correcting unit 12 corrects given color information (Xs, Ys, Zs) using the correction information to the second white point which is generated by the generating unit 11 in Step S52 and outputs corrected color information (Xd, Yd, Zd). In the process of correcting the white point, the amount of correction may be changed depending on luminance. In addition, the color region of the corrected color information may be geometrically converted depending on the color region when an image is formed, or when a color is outside the color region in which an image is formed during the correction process, for example, a process of converting the color into a color in the color region may be performed.

As an example of the correction process, similarly to Expression 1, corrected color information (Xd, Yd, Zd) may be calculated from given color information (Xs, Ys, Zs) by the following Expression 2:

$$\begin{pmatrix} X_d \\ Y_d \\ Z_d \end{pmatrix} = \begin{pmatrix} X_s \\ Y_s \\ Z_s \end{pmatrix} \times \frac{Y_p}{Y_w}. \quad \text{[Expression 2]}$$

In this case, as the information of the second white point (Xt, Yt, Zt), (Yt/Yp), which is a correction coefficient, may be received. When given color information is color information of another color space, such as an RGB color space, the color information may be converted into color information of the CIEXYZ color space and then the correction process may be performed. In addition, the correction process may use an expression during the conversion of the color space into another color space, such as a CIELAB color space, in addition to the CIEXYZ color space. Of course, the corrected color information may be converted into those in various kinds of color spaces.

For example, when color information corresponding to the white point of the image forming medium is present in the given color information and the correction process is performed, a color cast is likely to occur. In this case, the correction process is not uniformly performed on the white point of the image forming medium, but the correction process may be performed considering the white point as the color of a standard light source, such as D50 or D65. When a processing target is a color signal of a photographic image, not color information, the user may perform a uniform correction process, regardless of the color cast.

When the white point (Xj, Yj, Zj) is set (the white point in a sheet 1) in given color information (Xs, Ys, Zs) and the white point is matched with a white point (a target white point (Xp, Yp, Zp)) of an image forming medium (sheet 2) on which an image is formed, such as when a color on the sheet 1 is reproduced in a color on the sheet 2 in the CIEXYZ color space in a pseudo manner, the information of the second white point may be generated by the following Expression 3:

$$\begin{pmatrix} X_t \\ Y_t \\ Z_t \end{pmatrix} = \begin{pmatrix} X_w \times (X_p / X_j) \\ Y_w \times (Y_p / Y_j) \\ Z_w \times (Z_p / Z_j) \end{pmatrix} \times \frac{Y_p}{Y_w}. \quad \text{[Expression 3]}$$

In this case, the color correcting unit 12 may perform the color correcting process, similarly to Expression 3.

In this case, when the first white point (Xw, Yw, Zw) is a white point (Xj, Yj, Zj) and the sheet 1 and the sheet 2 are observed in a common observation environment under a common measurement condition, the luminance information Yw of the first white point is equal to the luminance information Yp of the target white point (Yw=Yp) and the luminance information Yt of the second white point (Xt, Yt, Zt) is equal to Yp (=Yw).

As measures against, for example, the color cast or fogging in the luminance direction, the luminance information Yw of the first white point may not be corrected up to the luminance information Yp of the target white point, but the luminance information Yt of the second white point may be set between the luminance information Yw and the luminance information Yp. For example, the information of the second white point (Xt, Yt, Zt) may be calculated using the coefficient α by the following Expression 4:

$$\begin{pmatrix} X_t \\ Y_t \\ Z_t \end{pmatrix} = \begin{pmatrix} X_w \\ Y_w \\ Z_w \end{pmatrix} \times \frac{Y_p}{Y_w} \times \alpha. \quad \text{[Expression 4]}$$

The correction information is (Yp/Yw×α). Of course, the coefficient α may be introduced into Expression 3 to calculate the information of the second white point (Xt, Yt, Zt).

The correction process for the white point has been described above, but the invention is not limited thereto. The above-mentioned structure may be applied to a correction process that is performed for other colors under the same conditions as those in the correction process for the white point.

Next, an example in which color information (Xs, Ys, Zs) that is given as a correction target is used to generate an output color profile will be described. Color information receiving the output color profile needs to correspond to the white point (for example, D50) of a standard light source. Therefore, the luminance of the first white point is the maximum. For example, when values in the CIEXYZ color space are represented by numerical values in the range of 0 to 100 (values other than Y may be equal to or less than 0 or more than 100), the luminance of the first white point may be 100. In this case, the second white point (Xt, Yt, Zt) may be calculated from the first white point (Xw, Yw, Zw) by the following Expression 5:

$$\begin{pmatrix} X_t \\ Y_t \\ Z_t \end{pmatrix} = \begin{pmatrix} X_w \\ Y_w \\ Z_w \end{pmatrix} \times \frac{100}{Y_w}. \quad \text{[Expression 5]}$$

The correction information is (100/Yw). Of course, the coefficient α described in Expression 4 may be introduced.

The color correcting unit 12 may multiply the first white point by a ratio 100/Yw of the white point to the luminance as the correction process for the color information (Xs, Ys, Zs) of a given output color profile, using the correction information to the second white point which is shown in Expression 5.

In order to avoid the occurrence of a color cast, the CIEXYZ values of a light source (for example, a D50 light source) may be set for the white point of the image forming medium. In this case, when there is a difference between the white point of the image forming medium and the light source in terms of calculation, color continuity is likely to be lost, which results in a difference in gradation. Therefore, the existing color changing process (for example, a color region mapping process, weighted average, and geometric conversion) may be performed on the basis of the white point of the image forming medium set to the light source.

Next, an example in which color information (Xs, Ys, Zs) that is given as a correction target is used for the color information (color information under a standard light source, such as D50 or D65) of an input color profile will be described. In this case, correction information to the second white point may be calculated using Expression 5 or the expressions having the coefficient α introduced thereto. When a combination of the input color profile and the output color profile that is designed relative to the image forming medium is used, it is necessary to correct the colors on the input side so as to be matched with the colors on the output side where relative color deviation occurs. Specifically, the white points of the image forming medium set by the output color profile may be the white point (Xj, Yj, Zj) and the first white point (Xw, Yw, Zw), the white point of the image forming medium set by the output color profile may be the luminance Yp of the target white point (Xp, Yp, Zp), and correction information to the second white point (Xt, Yt, Zt) may be calculated, similarly to Expression 3. The color correcting unit 12 may perform the color correcting process using the calculated correction information to the second white point. When it is necessary to convert the tristimulus value CIEXYZ into a perceptive color space (for example, CIELAB), the color correcting unit 12 may calculate the second white point (Xt, Yt, Zt) from the calculated correction information and use the second white point as a light source (a denominator during normalization) during conversion from CIEXYZ to CIELAB. The second white point (Xt, Yt, Zt) is the same as that normalized with the luminance Yw of the white point (Xw, Yw, Zw) of the image forming medium.

Figure 3:
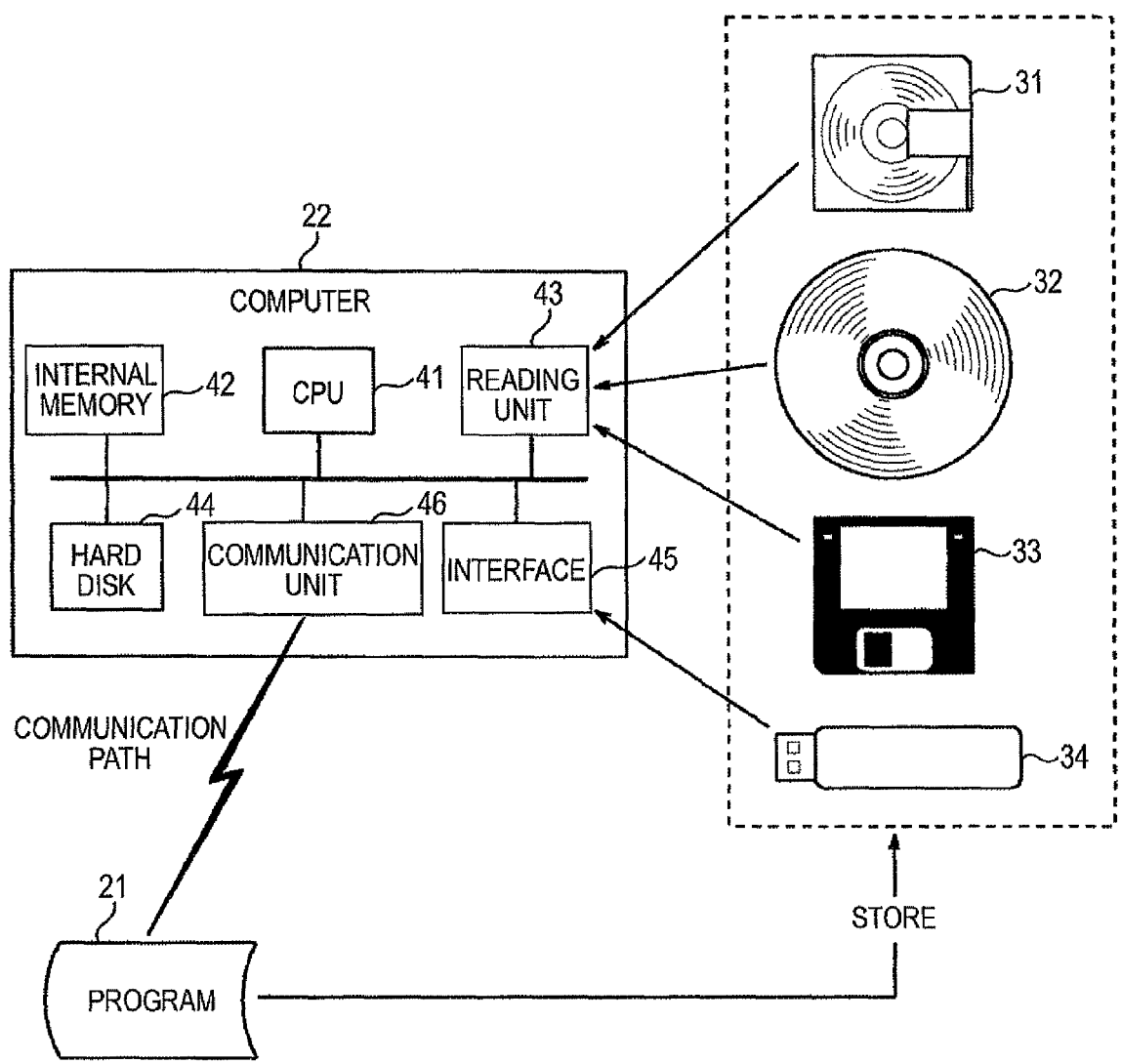
FIG. 3 is a diagram illustrating an example of a computer program that is used to implement the functions according to the exemplary embodiment of the invention, a storage medium that stores the computer program, and a computer.

FIG. 3 is a diagram illustrating an example of a computer program that is used to implement the functions according to the exemplary embodiment of the invention, a storage medium that stores the computer program, and a computer. In FIG. 3, reference numeral 21 is a program, reference numeral 22 is a computer, reference numeral 31 is a magneto-optical disc, reference numeral 32 is an optical disc, reference numeral 33 is a magnetic disk, reference numeral 34 is a memory, reference numeral 41 is a CPU, reference numeral 42 is an internal memory, reference numeral 43 is a reading unit, reference numeral 44 is a hard disk, reference numeral 45 is an interface, and reference numeral 46 is a communication unit.

All or some of the functions of each unit according to the above-described exemplary embodiment of the invention may be implemented by the program 21 executed by the computer. In this case, for example, the program 21 or data used by the program may be stored in a storage medium that is read by the computer. When the reading unit 43 provided in hardware resources of the computer causes a change in energy, such as magnetism, light, or electricity, applied to the storage medium according to the content of the program, the content of the program is transmitted in the form of signals corresponding to the change in energy to the reading unit 43. For example, the storage media include the magneto-optical disc 31, the optical disc 32 (including, for example, a CD and a DVD), the magnetic disk 33, and the memory 34 (including, for example, an IC card, a memory card, and a flash memory). Of course, the storage media are not limited to a portable type.

The program 21 is stored in the storage medium and the storage medium is inserted into, for example, the reading unit 43 or the interface 45 of the computer 22. Then, the computer reads the program 21 and stores the read program 21 in the internal memory 42 or the hard disk 44 (including, for example, a magnetic disk or a silicon disk). The CPU 41 executes the program 21 to implement all or some of the functions according to the above-described exemplary embodiment of the invention. Alternatively, the program 21 may be transmitted to the computer 22 through a communication path. Then, the computer 22 may receive the program 21 using the communication unit 46, store the program 21 in the internal memory 42 or the hard disk 44, and execute the program 21 using the CPU 41 to implement all or some of the functions.

Various other devices may be connected to the computer 22 through the interface 45. Of course, all or some of the devices may be configured by hardware. Alternatively, other structures and all or some of the functions according to each of the above-described exemplary embodiments of the invention may be configured as a program. When the program is applied for other purposes, the program may be integrated with programs for those purposes.

The foregoing description of the exemplary embodiments of the invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention is defined by the following claims and their equivalents.

What is claimed is:

1. A color processing apparatus comprising:
   a generating unit that generates correction information to a second white point from luminance information of a first white point, which is a white point of color information of a given processing target, and luminance information of a target white point; and
   a color correcting unit that performs a color correcting process on the color information of the processing target using the correction information to the second white point generated by the generating unit.

2. The color processing apparatus according to claim 1, wherein the generating unit generates correction information to the second white point of which luminance information is set between the luminance information of the first white point and the luminance information of the target white point.

3. The color processing apparatus according to claim 1, wherein, when information of the second white point is present in the color information, the color correcting unit performs the color correcting process using the second white point as a denominator of normalization, instead of a light source.

4. The color processing apparatus according to claim 1, wherein, when the color information is color data of an output color profile, the generating unit generates the correction information to the second white point using luminance information of a white point of a sheet as the luminance information of the target white point.

5. The color processing apparatus according to claim 1, wherein, when the color information is color data of an input color profile, the generating unit generates the correction information to the second white point using luminance information of a white point on an output side as the luminance information of the first white point, and the color correcting unit performs the color correcting process using the second white point that is generated on the basis of the correction information as a denominator of normalization, instead of a light source.

6. A non-transitory computer readable medium storing a color processing program causing a computer to execute a process, the process comprising:
   a generating step that generates correction information to a second white point from luminance information of a first white point, which is a white point of color information of a given processing target, and luminance information of a target white point; and a color correcting step that performs a color correcting process on the color information of the processing target using the correction information to the second white point generated by the generating step.

* * * * *